(No Model.) 2 Sheets—Sheet 1.

F. A. BROWNELL.
PHOTOGRAPHIC SHUTTER.

No. 580,595. Patented Apr. 13, 1897.

Witnesses:
Grace A. Roda
Thomas Durant

Inventor
Frank A. Brownell
by Church & Church
his Attys (No Model.) 2 Sheets—Sheet 2.
F. A. BROWNELL.
PHOTOGRAPHIC SHUTTER.
No. 580,595. Patented Apr. 13, 1897.
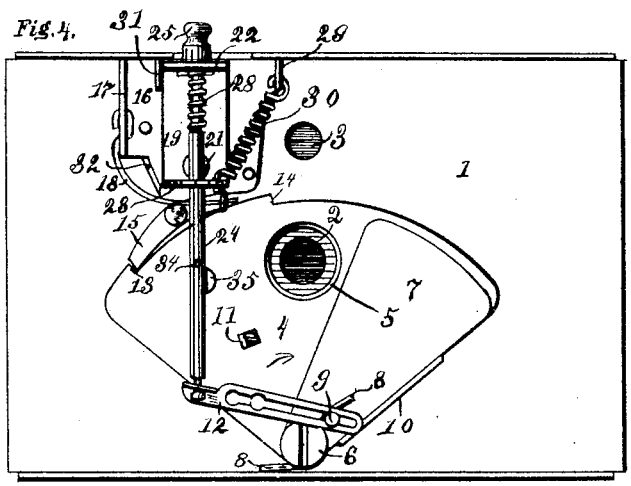
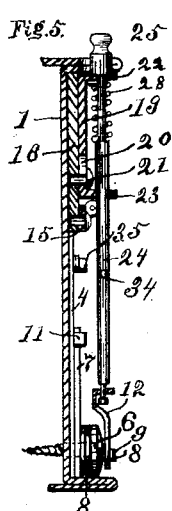
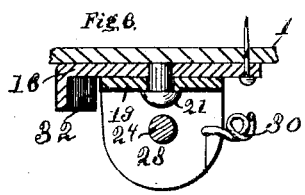
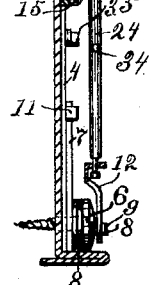
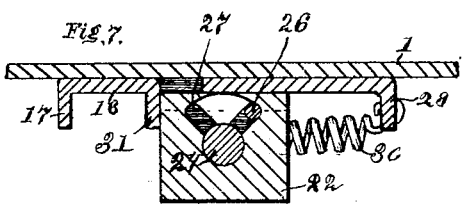
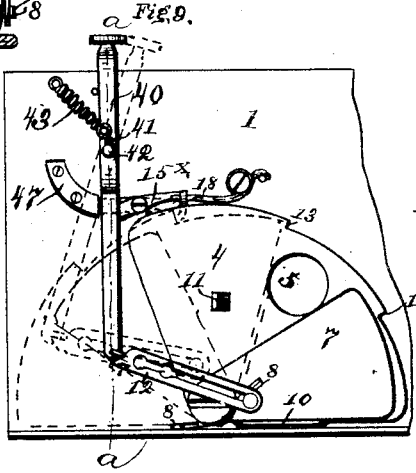
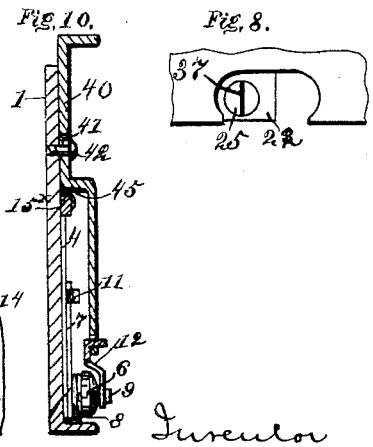
Witnesses:
Grace A. Poda.
Thomas Durant.
Inventor
Frank A. Brownell
by Church & Church
his attys

UNITED STATES PATENT OFFICE.

FRANK A. BROWNELL, OF ROCHESTER, NEW YORK, ASSIGNOR TO THE EASTMAN KODAK COMPANY, OF SAME PLACE.

PHOTOGRAPHIC SHUTTER.

SPECIFICATION forming part of Letters Patent No. 580,595, dated April 13, 1897.

Application filed May 11, 1895. Serial No. 548,982. (No model.)

*To all whom it may concern:*

Be it known that I, FRANK A. BROWNELL, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photographic shutters, and has for its object to provide an improved shutter adapted to be set and released by the movement of a single actuating member and also one readily adapted for making time exposures and requiring only the simplest manipulation on the part of the operator; and to these and other ends the invention consists in certain improvements which will be hereinafter described, and the novel features pointed out in the claims at the end of this specification.

Figure 1:
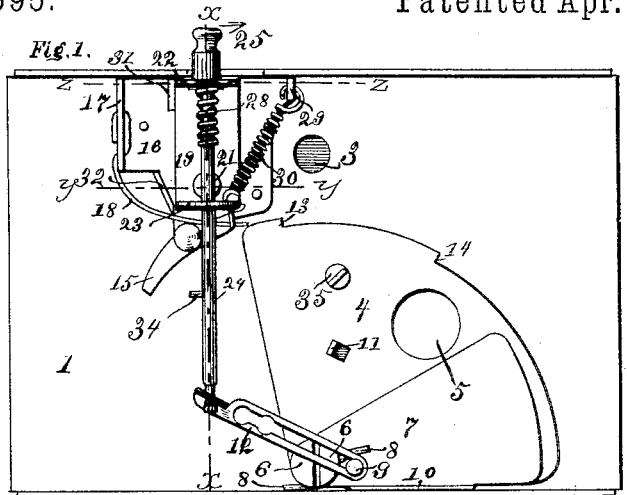
Figure 2:
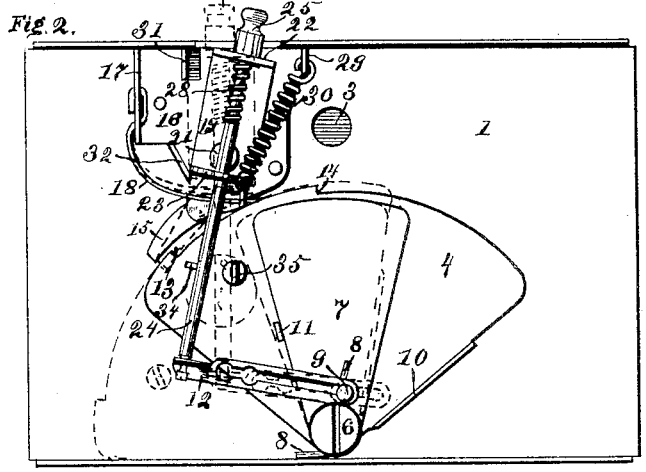
Figure 3:
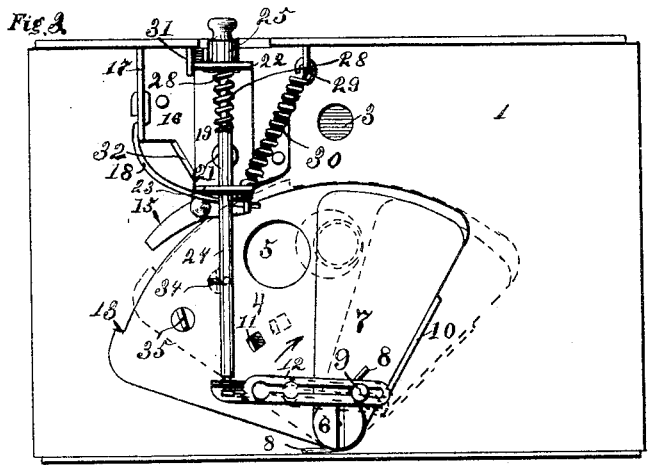

In the accompanying drawings, Figure 1 is a front view of a shutter constructed in accordance with my invention before being set; Fig. 2, a similar view showing the position of the parts while the shutter is being set for an instantaneous exposure and in dotted lines the position after having been set; Fig. 3, a similar view showing the shutter in motion in full lines when making an instantaneous exposure and in dotted lines the position it will assume when being set to make a time exposure; Fig. 4, a similar view showing the position of the parts with the lens-aperture open when making a time exposure, the position being the one the parts will assume when pressure on the releasing-bar is removed after the parts have assumed the position shown in dotted lines in Fig. 3. Fig. 5 is a sectional view on the line $xx$ of Fig. 1; Fig. 6, a horizontal sectional view on the line $yy$ of Fig. 1, considerably enlarged; Fig. 7, a similar view on the line $zz$ of Fig. 1, also enlarged; Fig. 8, a plan view of the end of the shutter-setting device; Fig. 9, a front view of a modification of my device, showing in dotted lines the shutter while being set; Fig. 10, a sectional view on the line $aa$ of Fig. 9.

Similar reference-numerals in the several figures indicate similar parts.

The shutter to which my present invention is shown applied is of the type embodying a main shutter having an aperture adapted to coincide with the lens-opening and an auxiliary shutter adapted to cover said aperture during the setting operation, this type being illustrated in Patent No. 440,137, granted to the Eastman Company, assignee of J. B. Church, and in the construction shown 1 indicates the plate or shutter support, which may constitute the front of the camera, if desired, provided with a suitable lens-opening 2 and an opening 3 for the finder-lens.

4 is the main shutter, having an exposing-aperture 5, pivoted upon pivot-pin 6, upon which is also pivoted an auxiliary or covering shutter 7, a motor in the form of a spring 8 extending around the pin 6 and operating upon a pin 9 on the auxiliary shutter to normally hold it against a stop-flange 10 on the main shutter, said spring also tending to operate the auxiliary shutter to the right to uncover the aperture 5 and through said auxiliary the main shutter to make the exposure, as indicated by the arrow in Figs. 3 and 4 of the drawings.

After the shutter has been operated to make an exposure it occupies the position shown in Fig. 1, and when it is to be set the auxiliary shutter is moved over to engage a stop 11 on the main shutter by an operating means, such as a slotted link 12, and through this lug or stop the main shutter is moved over to the position shown in dotted lines in Fig. 2, the exposing-aperture being covered during the passage. As soon as the main shutter has been arrested by a retaining dog or catch the motor-spring will hold the auxiliary shutter against the stop 10, uncovering the exposing-aperture in the main shutter and remaining under tension, or set.

With the object in view of simplifying the construction and facilitating the operation of shutters particularly of this class I provide a single movable member accessible from the exterior of the camera, by the movement of which in one direction the shutter is set and in another the retaining catch or dog is released, permitting an exposure to be made.

In the present embodiment of my invention I employ a movable member, preferably connected to the link 12, said member being capable of a movement in a direction to set the shutter and cause it to be retained by a retaining catch or dog, such as 15, adapted to be released by the movement of the operating member in another direction to cause the release of said shutter. The edge of the main shutter shown is provided with shoulders 13 and 14, the former being adapted to be engaged by the catch to hold the shutter with the lens-aperture open to make a time exposure and the latter to retain the shutter when set for making an exposure. The retaining catch or dog 15 is pivoted on the lower end of a support or plate 16, adapted to be secured to the shutter-support 1, one edge of said plate being turned up to form a flange 17, to which is connected a spring 18, engaging the catch 15 and throwing its operating end into the path described by the projections on the shutter.

The shutter setting and releasing movable member, which is connected to the link 12, is constructed in the present embodiment of my invention in the form of a lever having two parts, one consisting of the plate 19, having a slot 20, in which is arranged a pin 21, connected to the support 16, the upper and lower ends of this plate being turned out in the form of ears constituting guides 22 23 and the other part consisting of the rod 24, which passes through the guide-ears and has its lower end connected to the link 12. Arranged upon the upper end of this rod 24 is a knob or button 25, having upon its lower side a pin 26, adapted to rest in either of two perforations 27, formed in the lug 22, the portion of the lug between the perforations being depressed slightly, so that the sides of the perforations form stops limiting the movement of the rod, as shown in Fig. 7, and encircling the rod is a spring 28, operating upon a shoulder thereon and serving to hold the knob 25 down with the pin 26 in engagement with one of the perforations.

Connected to the plate 19 and to a flange 29, formed upon the plate 16, is a spring 30, so disposed relatively to the pivot 21 that it will hold the shutter setting and releasing member with the lower end of the slot 20 in engagement with the pivot and the upper portion of the plate 19 in engagement with an ear 31, struck up from the plate 16, as shown in Figs. 1 and 2.

The lower end of the plate 19 is arranged just below and near the end of the catch 15, so that the operation of setting and releasing the shutter for an instantaneous exposure will now be understood, the parts being in the position shown in Fig. 1. The operator moves the knob 25 to the right, as indicated by the upper arrow in Fig. 1, to the position shown in full lines in Fig. 2, this operation, through the means described, causing the auxiliary shutter to close the aperture in the main shutter, and as the knob is moved over against the tension of the spring 30 the shutter will be carried over to the position shown in dotted lines in said figure until the projection 14 is engaged by the end of the catch 15. It will be noted that the setting device is turned during this operation around the pivot-pin 21, but by reason of a small flange 32, struck up from the plate 16, the movement of the plate 19 longitudinally of the slot 20 is prevented. After the shutter has been set and is held by the catch 15 against the tension of the operating-spring the operating and releasing member is returned by the spring 30 to the position shown in dotted lines in Fig. 2 and also in full lines in Fig. 1. When it is desired to make an instantaneous exposure, it is only necessary to press upon the knob 25, causing the flange 23 to operate on the rear end of the catch 15, thereby releasing the shutter, the position of the parts at this time being shown in full lines in Fig. 3, the shutter moving in the direction of the arrow and having just commenced its movement. From this it will be seen that the only necessary movements to set and release the shutter are to move the knob 25 to the right, and after it has resumed its normal position to press upon it.

For the purpose of permitting time exposures to be made by the use of this shutter I arrange upon the rod 24 a pin 34, adapted to be projected at times into the path of a lug or time-stop 35, arranged upon the main shutter; but normally and when the shutter is used for instantaneous work this pin 34 is out of the path of said lug, being maintained in this position by the engagement of the pin 26 with one of the apertures 27 in the ear 22, as shown particularly in Figs. 1 and 9.

When it is desired to arrange the shutter for time exposures, the operator grasps the knob 25 and turns said rod, engaging the pin 26 with the other aperture 27 in the ear 22. He then sets the shutter as before, moving the knob to the right until the catch 15 engages the projection 14 on the shutter, and when the exposure is to be made the knob is pressed down, as in full lines in Fig. 3, causing the release of the catch 15, as before described, but the pin 34 is now in the path of the lug 35, and the shutter is therefore arrested just before the exposing-aperture comes in line with the lens-opening, and then by releasing pressure upon the knob the rod and pin 34 are moved upwardly out of engagement, (by the spring 30,) which movement also allows the engaging end of the catch 15 to move down and become engaged with the projection 13 on the shutter, in which position it is maintained with the shutter-aperture coincident with the lens-opening. When the lens-aperture has remained open for the desired length of time, it is only necessary to press upon the knob 25, again causing the release of the catch 15 and permitting the shutter to be closed by its actuating-spring.

In order that the operator may readily set the shutter for making time exposures, I provide a small mark 37 upon the upper end of the knob 25, said mark being in the line of the pin 34, so that it is simply necessary to grasp the knob, lift it, and turn it until the line extends transversely of the direction of movement of the shutter, the pin 26 engaging the side of the perforation, or he may move the knob with the line in the plane of movement of the shutter in order to set it for making instantaneous exposures.

Although I prefer the arrangement shown, in which the shutter setting and releasing member is made in two parts, it will be understood that it can be made of a single piece, as shown in Fig. 9, in which 40 indicates said member in the form of a lever connected to the link 12 at its lower end and having a slot 41 coöperating with the pivot-pin 42, 43 indicating a spring, which not only operates to return the arm to the position shown in full lines in said figures, but also to hold the lower end of the slot in engagement with the pivot-pin. The lever 40 is bent outward, forming a shoulder 45, which is adapted to engage the end of the retaining-catch 15$^\times$, said shoulder also coöperating with the stop-plate 47 to prevent its longitudinal movement except when in proper position to engage and release the catch 15$^\times$. The operation of the modification just described is precisely the same as that of the shutter shown in the other figures. Other modifications of this same feature of making the movable member capable of setting the shutter or putting its motor-spring under tension by movement in one direction and releasing it by movement in another will readily occur to those skilled in the art, and I do not, therefore, desire to be confined to precisely the construction shown; nor is my invention confined to a shutter of any particular description, although I prefer to use it in connection with one which can be set without causing the lens-opening to be uncovered, and of this class is one in which a progressively-moving apertured shutter is employed, the motor-spring being wound up behind it, as well known in the art.

It will be understood that, if desired, the time-stop 35 could be so arranged relative to the exposing-aperture in the shutter that when the projection 34 was in position for a time exposure and the member was moved down to engage it said aperture would be in line with the lens and the time exposure could then be made by holding the knob pressed down the requisite time, and in this event the projection 13 could be dispensed with.

I claim as my invention—

1. The combination with a photographic shutter, a motor therefor, and a catch for retaining the shutter against the tension of the motor, of a movable member independent of the catch for placing the motor under tension when moved in one direction and adapted to coöperate with the catch to release it when moved in another direction, substantially as described.

2. The combination with a photographic shutter, a motor therefor, and a catch for retaining the shutter against the tension of the motor, of a movable member independent of the catch connected to the motor for placing it under tension when moved in one direction and adapted to coöperate with the catch to release it when moved in another direction, substantially as described.

3. The combination with a photographic shutter, a motor device therefor, and a catch for retaining the shutter against the tension of the motor, of a laterally and longitudinally movable member independent of the catch, coöperating with the motor and catch and operating to place the motor under tension when moved in one direction and to release the catch when moved in the other direction, substantially as described.

4. The combination with a photographic shutter, a motor for operating and a catch for retaining it, of a support, a movable member coöperating with the motor and catch and having a loose connection with the support, and a spring connected to said member and actuating it in two directions, substantially as described.

5. The combination with a photographic shutter, a motor for operating and a catch for retaining it, of a support, a movable member coöperating with the motor and catch and having a loose connection with the support, whereby it is capable of movement in two directions, a spring connected to said member, and a stop for preventing the simultaneous movement of the member in both directions in which it is capable of movement, substantially as described.

6. The combination with a photographic shutter, a motor for operating and a catch for retaining it, of a support having stops, as 21 and 32, a movable member mounted on the support by a loose connection, a spring connected to the member, and a loose connection between the motor and member, substantially as described.

7. The combination with a photographic shutter having the two projections, and the time-stop thereon, a motor and a catch for engaging the projections, of a movable member capable of movement in two directions, one for setting the motor, and the other for releasing the catch, and the projection on the member adapted to be moved in the path of the time-stop, substantially as described.

8. The combination with a photographic shutter having the two projections, and the time-stop thereon, a motor, and a catch for engaging the projections, of a movable member capable of movement in two directions, one for setting the motor and the other for releasing the catch, and the adjustable projection on the member adapted to be moved into or out of the path of the time-stop, substantially as described.

9. The combination with a photographic shutter having a time-stop, a motor and a catch for engaging the shutter, of a movable member coöperating with the catch to release it, having the projection movable therewith and adjustable with relation to the path traversed by the time-stop, independently of the movement of the member to release the catch, whereby the catch may be operated by the member and the projection may be moved into the path of the time-stop to arrest the shutter or out of said path, substantially as described.

10. The combination with a photographic shutter, having the two projections and the time-stop, a motor and a catch, of a movable plate coöperating with the catch to release it, when moved in one direction, a rotatable rod on the plate having the projection adapted to engage and project into the path of the time-stop when moved in one position, substantially as described.

11. The combination with a photographic shutter, having the two projections and the time-stop, a motor and a catch, of a support, a plate pivoted and longitudinally movable on the support, and adapted to engage the catch, a rotatable rod on the plate having the projection for engaging the time-stop on the shutter, and the loose connection between the rod and motor, substantially as described.

12. The combination with a photographic shutter having the two projections and the time-stop, a motor and a catch, of a support, a plate pivoted and longitudinally movable on the support, having the guide-ears, the rod passing through the ears having the projection, the spring for moving said rod in one direction, the spring for moving the plate longitudinally and laterally, and a loose connection between said rod and the motor, substantially as described.

13. The combination with a photographic shutter, having a time-stop thereon, a catch for engaging the shutter, and a motor for the shutter, of a movable member capable of movement in two directions and adapted to coöperate with the catch, a loose connection between said member and the motor, a movable projection on the movable member adapted to be moved in the path of the time-stop, substantially as described.

14. The combination with a photographic shutter having two projections, and a time-stop thereon, a catch for engaging the projection, and a motor for the shutter, of a movable member capable of movement in two directions and adapted to coöperate with the catch, a loose connection between the motor and the member, and a movable projection actuated by the movable member and adapted to be projected in the path of the time-stop, substantially as described.

15. The combination with the photographic shutter, a motor device therefor, and a catch for retaining the shutter against the tension of the motor, of a support and the pin thereon, the movable member having the slot, the spring for moving the member lengthwise and laterally, and a connection between the member and motor, said member coöperating with the catch when moved longitudinally, whereby the motor may be placed under tension when the member is turned on the pivot, and when moved longitudinally the catch is released, substantially as described.

16. The combination with a photographic shutter having two engaging projections, and a time-stop, a motor, and a catch for engaging two projections on the shutter, of a movable member coöperating with the catch to release it, having the projection movable therewith, and adjustable with relation to the path traversed by the time-stop independently of the movement of the member to release the catch, substantially as described.

FRANK A. BROWNELL.

Witnesses:
F. F. CHURCH,
G. A. RODA.